Aug. 18, 1959     J. R. BATTALINE     2,899,809
FLEXIBLE COUPLING
Filed Dec. 17, 1957

INVENTOR.
JOHN R. BATTALINE.
BY *Louis V. Lucia*
ATTORNEY.

United States Patent Office 2,899,809
Patented Aug. 18, 1959

2,899,809

FLEXIBLE COUPLING

John R. Battaline, Wethersfield, Conn.

Application December 17, 1957, Serial No. 703,364

4 Claims. (Cl. 64—15)

This invention relates to a flexible coupling and more particularly to a coupling which will compensate for misalignment between two sections of a shaft.

An object of this invention is to provide such a coupling which is economical to manufacture, highly efficient in its operation and capable of transmitting full torque.

Further objects and advantages of this invention will be more clearly understood from the following description and the accompanying drawings in which.

Figure 1:
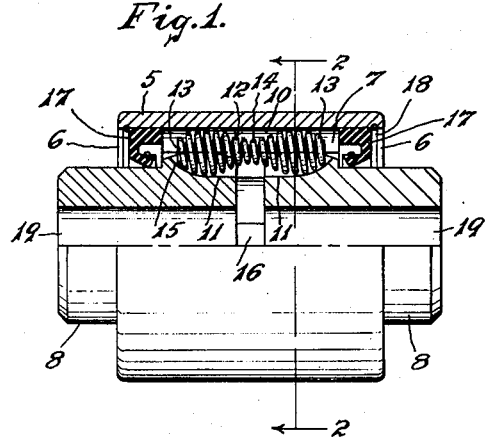
Fig. 1 is a side view, partly in central vertical section, of a coupling embodying the present invention.
Figure 2:
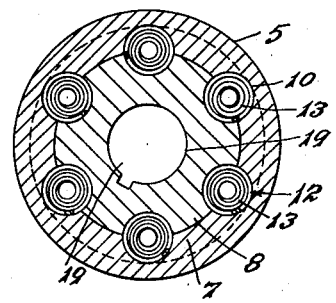
Fig. 2 is a sectional end view on line 2—2 of Fig. 1.
Figure 3:
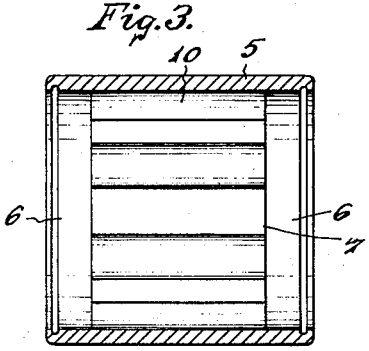
Fig. 3 is a sectional side view of the outer member of said connector.
Figure 4:
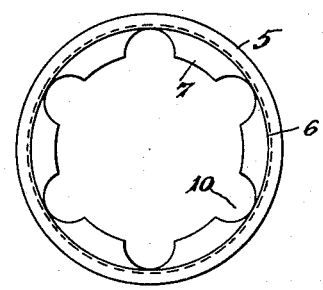
Fig. 4 is an end view of said outer member.
Figure 5:
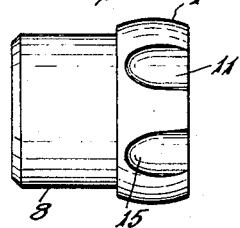
Fig. 5 is a side view of one of the inner members used in said coupling.
Figure 6:
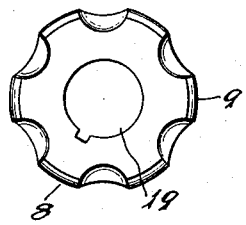
Fig. 6 is an end view thereof.

As shown in the drawings, my improved coupling includes a tubular outer member 5 providing a casing having end recesses 6—6 and an intermediate inwardly extending rib 7.

A pair of oppositely opposed inner members 8—8 are mounted within the said outer member and each of said inner members has an axially bored hub with a flange portion 9 thereon that has a spherical outer surface which fits swively inside of the rib 7. The said rib is provided with a plurality of longitudinal slots 10 that are cross-sectionally semi-circular and the flange 9 of each member 8 has a plurality of notches 11 therein which are correspondingly shaped and disposed oppositely to the slots 10 to form cross-sectionally circular chambers between the said inner members 8—8 and the outer member 5.

The said inner and outer members are connected against relative rotation by means of a plurality of keys comprising helical spring members 12 which are contained within the said chambers and provide a plurality of keys for swively securing each of the hub members to the outer casing. The said spring members are preferably of substantially figure 8 formation providing barrel-shaped end portions 13—13 and an intermediate connecting portion 14 of lesser diameter than the said end portions. It will be noted that the said barrel-shaped portions will permit the inner members 8—8 to swivel within the tubular outer member without interference between the bottoms of the notches 11 and the said spring members. Also, the said bottoms of the notches 11 are curved upwardly, or concave, as at 15, and conform with the shape of said end portions 13—13 to thereby provide an abutment lengthwise of the spring members 12 for retaining the inner members 8—8 in separated position, as shown in Fig. 1, with a space between them, at 16, to prevent interference with the swivel movement of said inner members in the outer member 5.

A pair of resilient dust shields 17—17, which will also serve as packing rings, are provided within the end recesses 6—6 and between each of the inner members 8—8 and the outer member. These rings also act to prevent separation of the inner members and disassembly of the coupling and said rings are secured in position by spring retaining rings 18—18 which are expanded into annular grooves in the inner surfaces of the wall portions surrounding the said recesses 6—6.

The inner members 8—8 are provided with axial bores 19—19 to receive the adjacent end portions of shafts connected by said coupling and said inner members may be keyed to the shafts against rotation and secured thereto in any suitable manner, such as by means of a set screw, not shown, which may be provided in the hub portion of each inner member if desired.

I claim:

1. A flexible coupling including a tubular outer member having a plurality of longitudinal slots spaced around the inner surface thereof, a pair of inner members having annular portions with substantially spherical outer surfaces fitting swively within the said outer member, the said portions of the inner members having notches therein cooperating with the slots in the outer member to form chambers between said outer and the inner members, a plurality of keys comprising spring members contained within said chambers and swively connecting the outer member to said inner members for rotation therewith, and means for mounting said inner members axially upon adjacent end portions of separate shafts.

2. A flexible coupling including a tubular outer member having a plurality of slots spaced around the inner surfaces thereof, a pair of inner members each having a substantially spherical portion fitting swively within said outer member, the said portions of the inner members having therein a plurality of spaced notches cooperating with the slots in the outer member to form chambers between said outer and inner members, the bottoms of said notches being concave, a plurality of elongated keys comprising spring members contained within said chambers and each having a pair of enlarged outer portions disposed in the notches of the opposite inner members and an intermediate connecting portion of a lesser diameter than the said end portions, the said spring members being operative to retain the said inner members in spaced position by endwise abutment between the end portions of the spring members and the bottoms of the respective notches in the inner members, means for swively retaining said inner members within the outer member, and means for axially mounting said inner members upon adjacent end portions of separate shafts.

3. A flexible coupling including a tubular outer member having an axial bore with a rib portion extending inwardly therein, the said rib portion having a plurality of spaced slots extending lengthwise therethrough, annular grooves within said outer member adjacent the opposite ends of the said rib portion, a pair of inner members each having a hub portion and a substantially spherical flange portion fitting within the said rib portion, the said flange portion of each inner member having therein a plurality of substantially concave notches cooperating with the slots in said rib portion of the outer member to form chambers between said outer and inner members, a plurality of elongated spring members fitting within said chambers and thereby connecting the outer and inner members against relative rotation, the said spring members having enlarged substantially barrel-shaped end portions fitting within the concave notches of the inner members and a reduced intermediate connecting portion to permit swivel movement between each of said end members and the outer member, the said enlarged portions of the spring members abutting the bottoms of the notches in the inner members endwise and thereby yieldingly retaining said inner members separated from each other, means disposed within the annular recesses of the outer member for retaining said end members within said outer member, and means for axially mounting said end members upon and securing them to adjacent end portions of separate shafts.

4. A flexible coupling including a tubular outer member having an axial bore, an annular rib portion within said bore and annular recess adjacent the opposite sides of said rib portion, the said rib portion having a plurality of inwardly open spaced slots cross-sectionally semi-circular and extending longitudinally of said outer member, a pair of inner members each having a hub portion and a flange portion substantially spherical and fitting swivelly within the said rib portion, the said flange having therein a plurality of spaced notches cross-sectionally semi-circular on a plane perpendicular to the axis thereof and for a portion of their length inwardly from the inner ends of said inner members, the outer portions of said notches being concave, the said slots and notches cooperating to form key receiving chambers between the outer and inner members, a plurality of elongated keys comprising helical spring members contained in said chambers and connecting the outer and inner members against relative rotation, the said spring members having substantially spherical end portions and a reduced intermediate end portion, the said end portions of the spring members fitting within the notches of the inner members and allowing swivel movement between said inner members and the outer member, the said end portions also abutting the concave portions of the notches in the inner members and thereby yieldingly separating the said inner members to prevent interference between them during swivel movement thereof, means disposed within said annular recesses for preventing separation of the inner members from the outer members, and means for axially mounting said inner members upon adjacent end portions of separate shafts.

References Cited in the file of this patent

UNITED STATES PATENTS

| | | |
|---|---|---|
| 1,321,249 | Shepherd | Nov. 11, 1919 |
| 1,552,656 | Tubbs | Sept. 8, 1925 |
| 2,119,678 | Lindner | June 7, 1938 |
| 2,701,456 | Brownstein | Feb. 8, 1955 |